(12) United States Patent
Gatliff

(10) Patent No.: US 7,272,911 B2
(45) Date of Patent: Sep. 25, 2007

(54) ROOT MANAGEMENT SYSTEM

(76) Inventor: Edward G. Gatliff, 7355 Dixon Dr., Hamilton, OH (US) 45011

( * ) Notice: Subject to any disclaimer, the term of this patent is extended or adjusted under 35 U.S.C. 154(b) by 35 days.

(21) Appl. No.: 10/797,427

(22) Filed: Mar. 10, 2004

(65) Prior Publication Data

US 2004/0194374 A1    Oct. 7, 2004

Related U.S. Application Data

(60) Provisional application No. 60/453,463, filed on Mar. 10, 2003.

(51) Int. Cl.
*A01B 79/02* (2006.01)
(52) U.S. Cl. .................................. 47/58.1 R
(58) Field of Classification Search ............ 47/58.1 R, 47/73, 32.7, 32
See application file for complete search history.

(56) References Cited

U.S. PATENT DOCUMENTS

| | | | | |
|---|---|---|---|---|
| 3,057,116 A | * | 10/1962 | Szochet | 47/58.1 R |
| 3,184,890 A | * | 5/1965 | McKey | 47/73 |
| 3,302,325 A | * | 2/1967 | Ferrand | 47/74 |
| 3,828,473 A | * | 8/1974 | Morey | 47/58.1 R |
| 4,019,279 A | * | 4/1977 | Moorman et al. | 47/32.8 |
| 4,457,102 A | * | 7/1984 | Ploeger, Jr. | 47/58.1 R |
| 5,070,642 A | * | 12/1991 | Albrecht | 47/32.7 |
| 5,305,549 A | | 4/1994 | Albrecht | |
| 5,371,967 A | * | 12/1994 | Albrecht | 47/78 |
| 5,383,302 A | * | 1/1995 | Hill | 47/78 |
| 5,528,857 A | | 6/1996 | Ashleigh et al. | |
| 5,647,169 A | * | 7/1997 | Bui | 47/78 |
| 5,829,191 A | * | 11/1998 | Gatliff | 47/58.1 R |
| 5,829,192 A | | 11/1998 | Gatliff | |
| 5,878,528 A | * | 3/1999 | Pattyn | 47/32 |
| 5,947,041 A | | 9/1999 | Licht | |
| 6,189,262 B1 | | 2/2001 | Gatliff | |
| 6,250,237 B1 | | 6/2001 | Licht | |

FOREIGN PATENT DOCUMENTS

SU    1794405 A1 *  2/1993

* cited by examiner

*Primary Examiner*—Francis T. Palo
(74) *Attorney, Agent, or Firm*—Lerner, David, Littenberg, Krumholz & Mentlik, LLP

(57) ABSTRACT

A method of growing commercially valuable crops to improve crop production is disclosed. The method comprises creating a hole in the earth, preparing the hole to influence the downward growth of the root system of a tree planted therein, planting a tree in a rooting medium in the hole, growing commercially valuable crops on the tree by providing water and nutrients to the tree, and harvesting commercially valuable crops from the tree.

19 Claims, 7 Drawing Sheets

FIG. 9
FIG. 10
FIG. 11
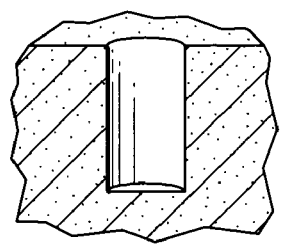
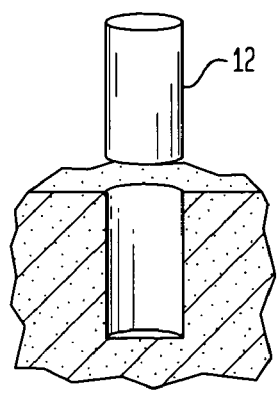
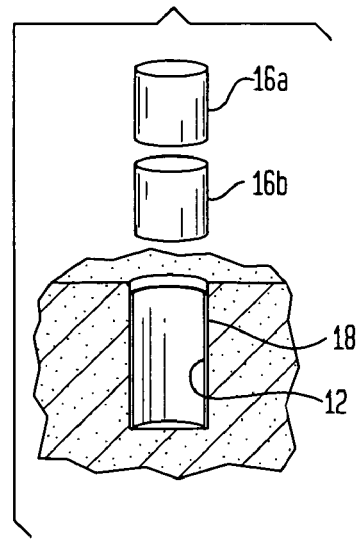
FIG. 12
FIG. 13
FIG. 14
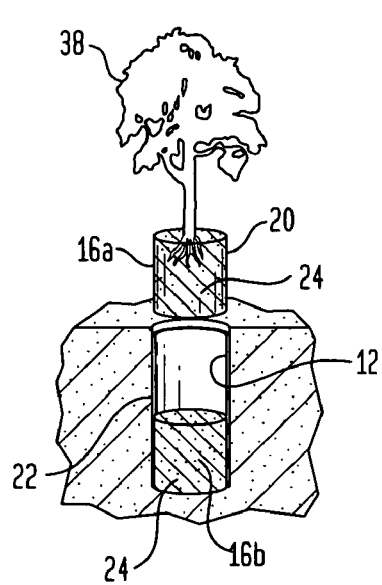
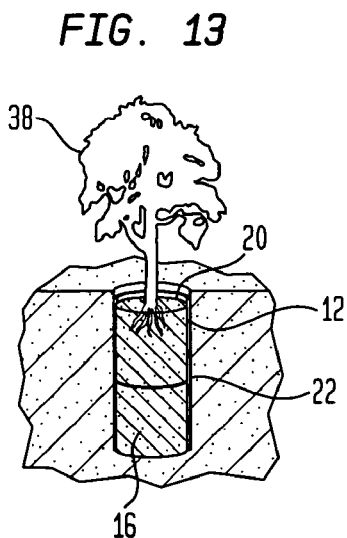
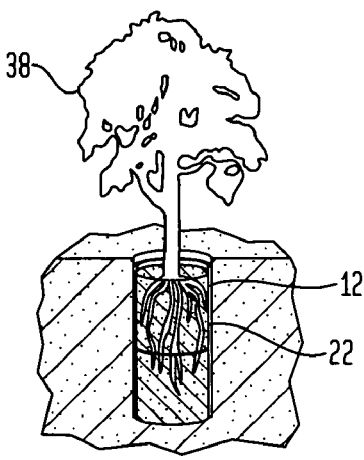

ROOT MANAGEMENT SYSTEM

CROSS-REFERENCE TO RELATED APPLICATION

The present application claims the benefit of U.S. provisional application Ser. No. 60/453,463, file Mar. 10, 2003, the disclosure of which is hereby incorporated by reference herein.

BACKGROUND OF THE INVENTION

Field-grown terrestrial vegetation, such as plants grown in orchards and arbors, as well as other woody and herbaceous plants, is managed today in a manner that has changed little over the past several centuries. This is primarily due to the management requirements of the naturally distributed root system, which tends to be horizontal and near the soil surface (i.e., primarily in the top 2 to 4 feet of the soil profile), which is shown in FIG. 1. Horizontal root distribution requires that much care and management go into ensuring the uniform distribution of water, chemicals and nutrients so that all of a plant's root system can benefit. Even with the advent of sprinkler irrigation and chemical sprays, the horizontal root distribution pattern of woody plants requires large areas for development and, along with top growth, helps dictate plant population density.

Plant establishment and growth can be affected by root zone management. Weeds and other vegetation competing for water and nutrient inputs is one of the critical obstacles to plant establishment and growth after planting. Considerable cost and effort is provided to overcome the negative impact of this competition. Failure to limit this competition typically results in poor establishment and growth of a plant.

Crop production, both quality and quantity can also be affected by root zone management. For example, in citrus trees, only the outer 3-foot layer of the canopy is productive. Of the inner layer, productivity is limited by the shading of the outer layer. As a result, trees with larger diameter canopies take up more space but are less productive on a per unit area basis. In recent years, researchers have been exploring methods to increase plant populations of citrus groves. One method is to plant more trees and aggressively prune the top growth of the tree to prevent the canopies from developing large diameters. Other methods have studied root pruning by physical and chemical means to help limit the canopy diameter. Again, the primary reason for trying to limit the canopy diameter and increase plant populations in these situations is to increase crop productivity.

Management and production of arbors, such as grapes, can also be difficult for a number of reasons. Heavy rainfall at inopportune times, such as during the critical pre-harvest period, can cause the fruit to become gorged with water and split, potentially spoiling much of the value of the crop. In addition, much attention has been directed to the spreading of soil-born diseases such as *Armillaria mellea* throughout vineyards up and down the California coastline. At the same time, this multi-billion dollar industry is under increasing pressure ranging from the ban on soil fumigants, growing competition for water and the need to limit pollution. For example, the ban of the soil fumigant methyl bromide in 2005 is anticipated to have severe economic implications for growers, and the demand for an alternative product or method is great.

Another limitation to productivity caused by a naturally developed horizontal root system is the common need to allow the land to lie fallow for a period of time after the removal of dead or diseased trees and before replanting new trees can occur. This is primarily caused by the necessity to either eliminate pathogens in the soil or reduce the phytotoxic effects on the new root system by the old root system. As a result, land may be unproductive for up to five years and may require significant management during that same period.

Beyond productivity, environmental pollution caused by the runoff and leaching of chemicals and nutrients into the groundwater is also of major concern in some areas. Even with tightly controlled irrigation programs that would limit the potential for chemical leaching, uncontrolled rainfall events can flush chemicals out of the root zone, through the soil profile, and into the groundwater, potentially allowing the chemicals to be washed or eroded from the soil surface into public waterways.

These and other issues associated with the management of horizontal root systems can be mitigated through the application of deep rooting technology. This technology can be utilized to develop columnar-like root distribution where inputs such as irrigation, chemicals and nutrients can be tightly controlled.

SUMMARY OF THE INVENTION

The present invention concerns root management technology, which can be applied to manage the establishment, growth and production, quantity, and quality of landscaped trees, vegetation, and crop systems such as orchards (e.g., oranges, apples and most other fruit-bearing plants, including strawberries and other high-value field crops that are grown in a row), arbors (e.g., grapes) and other woody or herbaceous crop systems, as well as a variety of other commercially valuable plants, including but not limited to timber crops, fiber crops (e.g., hemp) and medicinal crops.

In one aspect of the invention, the root management system is utilized in an in-field system for crops such as citrus trees and grapes. Such a system permits the growth of commercial quantities of trees for harvesting for retail sale or for further processing of the trees (e.g., producing orange juice from oranges grown on the trees in the system). Thus, the system would involve distributing the trees and/or crops to wholesalers or retailers for sale or resale. In one aspect of the invention, a hole is created in the earth. The hole is prepared to influence the downward growth of the root system of a tree planted therein. A soil medium is provided within at least a portion of the prepared hole. A tree is established and grown in the prepared hole by controlling root development and access to water and nutrients, resulting in commercially valuable crops or products. The commercially valuable crops or products, which may include the tree itself, are harvested. The harvested crops may then be transported for further distribution or processing. Such distribution may include distribution to wholesalers, retailers, or processing facilities.

In another aspect of the invention, the root management system is utilized to establish and grow plants for transplantation, for example, in fields or for landscaping purposes. In one aspect of the invention, a hole is created in the earth. The hole is prepared to influence the downward growth of the root system of a tree planted therein. The hole may be prepared by providing a flexible or rigid casing therein. In another aspect of the invention, a cartridge system may be utilized, wherein a cartridge may be inserted into the prepared hole, such the cartridge will influence the downward growth of the root system of a tree planted therein. A tree is established and grown in the cartridge or casing. The tree may then be harvested with its resulting substantially long and narrow root system and distributed to greenhouses or other commercial entities where the tree may be transplanted, or in the alternative, prepared for sale or resale, or for further transplantation. Creating and preparing a hole in accordance with the invention at the site of transplantation may facilitate transplantation of the tree. Thus, in this method, a grower may grow trees in commercial quantities in the casing or cartridge of the root management system of the present invention and harvest and distribute the trees for transplantation.

If a cartridge system is utilized, the cartridge may be inserted directly into the hole, or inserted into a hole that is prepared with a liner or casing. The cartridge may be segmented to permit more manageable removal when transplanting a tree grown in the system. Preferably, the cartridge would be at least 5 feet deep and may be segmented into sizes that are manageable to insert and remove. Upon removal, the cartridge may contain the tree and soil. Upon establishment and sufficient growth of the tree, the tree/soil and cartridge are harvested. Depending upon the size of the root system developed by the tree, only the cartridge segment nearest the top of the ground may require removal. Thus, a grower may wish to leave in place the additional subsurface cartridges. The tree, soil and cartridge may then be transplanted to another location for transplantation. In preparation for transplantation, a hole is created and prepared in the new location, and a casing is inserted into the hole if necessary. Depending upon the size of the new hole and depth of the tree/soil/cartridge, additional cartridges containing soil medium may be inserted into the hole and/or casing prior to transplantation of the tree/soil/cartridge.

In another aspect of the invention, the root management system may be used to establish and successfully grow trees in an urban setting. This method utilizes the root management system of the present invention to establish and grow trees in an urban setting to provide improved aesthetics. In many settings, especially in urban or environmentally damaged landscapes, soil and groundwater conditions are unfavorable or unsuitable for tree growth. The columnar rooting system allows for planting in a soil media independent of the surrounding soil matrix, thereby eliminating any negative impact caused by the existing environmental conditions. As a result, trees can be established and allowed to flourish, even in vegetatively barren landscapes. Any suitable rooting medium may be selected. Irrigation and other crop production activities may be required in some circumstances.

The method allows for the establishment and growth of a healthy, productive tree that may not require as much management to maintain its viability in comparison to a "naturally grown" tree. For example, in semi-arid and arid areas, a tree grown in the root management system of the present invention could require less watering to support healthy growth and maintenance of the tree (e.g. once per month vs. once per week). In addition, establishment and growth of trees utilizing the root management system in an urban setting would permit the establishment of trees in areas where there are a number of factors that may affect the growth and health of a tree, for example, in areas where the natural soil medium would not favor the growth of particular types of trees. The root management system of the present invention allows one to select a soil medium more favorable to the growth of the particular plant. In addition, the root management system could be designed to protect plants from surrounding environmental conditions and stresses that could hinder the health and viability of plants grown in such conditions. For example, the root management system would permit establishment and growth of trees in areas where there are high concentrations of road salt, industrial waste, sewage, pesticides, competition from existing vegetation, etc. that could negatively impact the viability of trees grown under these conditions.

One of the most promising benefits of the root management system of the present invention is the rigid management of input such as water, fertilizer and root-absorbed chemical pesticides. Much of the chemical fertilizer and pesticides that are applied to plants are never absorbed or utilized by the plant. Instead, the fertilizer and pesticides are washed away as run-off or are leached through soil to the groundwater below. As a result, environmental problems from fertilizer and pesticide run-off, as well as groundwater contamination, have long been negative consequences associated with farming. However, such pollution problems can be greatly reduced or eliminated by better input management, which is possible with the columnar-type root management system of the present invention. For instance, the application of root-absorbed systemic pesticides directly to the root column could reduce the need for aerial spraying, resulting in a reduction in air pollution. Importing pest-free soil may also eliminate the need for application of toxic soil fumigants prior to planting. In addition, a leachate collection/recycling system could be added to the base of the columnar root system to further enhance the pollution prevention.

In addition, availability of ample water for irrigation is a great expense as well as a limited resource in nearly all agricultural production. The root management system of the present invention permits growers to concentrate irrigation to the immediate rooting column while also reducing wasted water in the form of run-off. In general, the grower will have more control of the application of inputs, which not only reduces waste and pollution, but also costs.

Another benefit of the root management system of the present invention is that growers are not limited to fertile, chemistry-specific soil to grow certain plants. The imported soil that may be used as the planting/rooting media can be highly tailored to suit specific requirements for individual plants. The selection of "designer" soils would allow a grower to impart a certain quality to the product realized from the vegetation grown thereon. The utilization of vegetative systems in areas presently unusable due to soil conditions (contaminated sites, alkaline soils, heavy clay soils, etc.) is also possible with this system. For example, there is an opportunity for planting orchards in saline soils, where agricultural endeavors are nearly impossible with traditional methods.

The root management system of the present invention also permits vegetative systems to be established in regions where a climate previously made it impossible for production. Grapes that are presently only grown in the "wine country" because of its climate and soil could potentially be produced in other areas by duplicating the properties of "wine country" soil and simulating rainfall patterns with irrigation. The root management system of the present invention can also protect plants from rainfall events during critical pre-harvest period where too much moisture at the wrong time can cause the fruit to become gorged with water and split, spoiling much of the value of the crop.

Some woody-crop systems require that the soil lie fallow for periods up to five years to allow root pathogens to die out and to allow phytotoxins associated with the previous root system to dissipate. The root management system and methods of the present invention allow for planting in a soil media independent of the surrounding soil matrix, thereby eliminating any negative impact from previous root systems. As a result, fallow periods may be reduced, if not entirely eliminated. Without a required fallow period, the root management system would permit the ready replacement of dead or damaged trees with potentially more mature nursery trees. Any suitable rooting medium may be selected, as would be understood one of ordinary skill in the art.

Plant densities may also be managed utilizing the root management system of the present invention. For example, common planting density for citrus orchards is approximately about 150 to 200 trees per acre. Planting densities have increased significantly over the last 25 years (for example, in 1977, 113 trees were planted per acre). For vineyards, the planting density has a broader range from about 800 to 2000 plants per acre. The upper values described are present on those progressive vineyards which utilize high density planting methods. Plant densities using the drilled or trenched system of the present invention would be comparable to common plant densities. In some cases, however, it might be desirable to reduce the size of the plant's canopy by controlling root growth and development, which would permit a greater number of plants per acre to be planted, which may increase yields and/or effect crop quality. For example, with citrus trees, reducing the canopy size is desirable, as only the outer 3-foot layer of the canopy produces fruit. By having smaller canopies per plant, one would be able to plant more trees per acre. In addition, it is conceivable that planting populations could be doubled, which would significantly increase yield resulting in a less non-productive area. Alternatively, there could be cases where fewer plants per acre would be warranted since the root management system of the present invention may allow better management of the plant. In this case, fewer, better managed plants, would maximize yield or crop quality.

The flexibility of the material used for the flexible casing 10 facilitates the self-sealing aspect of the tree harvested and used for transplantation in accordance with the present invention. The self-sealing quality of the flexible casing 10 inhibits the migration of water in the upper levels or surface of the ground to lower levels of soil. A pliable plastic material as discussed above seals tightly to the outside soil as the lined hole is filled with soil, gravel or other fill material. Also, it will be extremely difficult for roots to grow through. An additive may be added to at least portions of the walls of the hole to facilitate creation of a seal between the flexible casing and soil outside of the hole.

These and other aspects of the invention may be realized by creating a hole in the earth, preparing the hole to influence the downward growth of the root system of a tree planted therein, planting a tree in a rooting medium in the prepared hole, establishing and growing the commercially valuable tree by controlling root development and access to water and nutrients, resulting in a more desirable, larger tree or harvestable commercially valuable crop or component of the tree (such as the wood, fruit or the larger tree that could be transplanted), harvesting the commercially valuable tree or component of the tree and distributing the tree for sale, resale, or further processing.

As part of this embodiment, the walls of the hole are lined with a material that may or may not be substantially impervious to water and nutrients for root growth, such that the root growth of the tree is maintained within the lined hole and is directed downward. The lined hole is at least partially filled with a rooting medium. A tree is planted in the at least partially filled hole. The tree is established and grown by controlling root development and access to water and nutrients. Commercially valuable products are produced by controlling the availability of water and nutrients to the tree. The tree, with its resulting long and narrow root system, and/or crops are harvested. The harvested products may then be distributed for sale or resale, or for further processing. This material may be a flexible or rigid casing.

In an alternative aspect of the invention, a permanent or removable cartridge of tree-root system and rooting medium may be provided at least partially in the lined hole, whereby the structure of the lined hole and/or cartridge influences the root system of the tree to grow downward within the cartridge. The cartridge may be rigid or flexible.

Another aspect of the invention relates to a method of growing commercially valuable plants with long and narrow root systems, whereby a hole is created in the earth, the hole is prepared to influence the downward growth of the root system of a tree planted therein by lining the walls of the hole with a material that may or may not be substantially impervious to water and nutrients for root growth such that the root growth of the tree is maintained within the lined hole and is directed downward, and a permanent or removable cartridge of tree-root system and rooting medium is provided at least partially in the lined hole, whereby the structure of the lined hole and/or cartridge influence the root system of the tree to grow downward within the cartridge. The walls of the hole may be lined with a flexible casing. An additive may optionally be added in at least portions of the walls of the hole to facilitate the creation of a seal between the flexible casing and the soil outside of the hole. Alternatively, the walls of the hole may be lined with a rigid casing. If a rigid, permanent or removable cartridge is used in this method, this cartridge may comprise a plurality of units or segments.

Another aspect of the present invention relates to a method of growing transplantable commercially valuable plants with long and narrow root systems, which can be realized by providing an elongate cartridge having a first and a second end, placing the root system of a tree or plant at least partially into the first end of the cartridge such that the remainder to the tree or plant is outside of the cartridge, and providing a rooting medium within at least a portion of the cartridge, whereby the root system of the tree or plant is encouraged to grow long and narrow. This method may further include the step of planting the tree or plant with the long and narrow root system by placing the cartridge in the earth to facilitate growth of the tree at a new site.

Another aspect of the present invention relates to a method of growing commercially valuable trees or plants with a long and narrow root system that can be realized by creating a hole in the earth, preparing the hole to influence the downward growth of the root system of a tree planted therein by providing a casing made of a material that is substantially impervious to water and nutrients for root growth, the casing having a first end, a second end and at least one opening in between the first end and the second end, whereby the root growth of the tree is directed downward, except that root growth is also permitted through at least one opening in the casing, and lining the walls of the hole with such casing, at least partially filling the lined hole with a rooting medium, providing a tree, and planting the tree by placing the root system of the tree at least partially in the rooting medium.

A further aspect of the present invention relates to a method of growing commercially valuable trees or plants with long and narrow root systems that can be achieved by creating a hole in the earth, preparing the hole to influence the downward growth of the root system of a tree planted therein by lining the walls of the hole with a material which may or may not be substantially impervious to water and nutrients for root growth such that the root growth of the tree is maintained within the lined hole and is directed downward, providing a rooting medium within at least a portion of the prepared hole, whereby the root system of the tree planted therein is encouraged to grow long and narrow, providing a tree, and planting the tree by placing the root system of the tree at least partially in the rooting medium, whereby the structure of the prepared hole influences the root system of the tree to grow downward.

Another aspect of the invention relates to a method of growing commercially valuable trees or plants with long and narrow root systems that can be achieved by creating a trench in the earth, preparing the trench to influence substantial downward growth of the root system of a plant planted therein by lining the walls of the trench with a material which may or may not be impervious to water or nutrients for root growth, such that the root growth of the tree is maintained within the lined trench and is directed downward, providing a rooting medium within at least a portion of the prepared trench, whereby the root system of the plant planted therein is encouraged to grow long and narrow, providing a plant, and planting the plant by placing the root system of the plant at least partially in the rooting medium, whereby the structure of the prepared trench influences the root system of the plant to grow within the trench and downward.

Another aspect of the invention relates to a method of growing commercially valuable trees or plants with long and narrow root systems whereby a module is provided having at least two cavities, wherein the cavities are elongate permitting the growth of an elongate root system. The cavity is at least partially filled with a rooting medium. Plants suitable for growth in the cavities are selected and provided, and the plants having root systems are planted in the rooting medium within the cavities.

Yet another aspect of the invention provides an orchard system for growing commercially valuable trees or plants with long and narrow root systems. An orchard system according to this aspect of the invention desirably includes a plurality of trees planted according to the methods described above.

A further aspect of the present invention relates to a cartridge for growing commercially valuable trees or plants with long and narrow root systems. The cartridge comprises an elongate structure which may or may not be substantially impervious to water and nutrients for root growth, such that the root system of a tree planted therein is maintained within the structure and is directed downward. The cartridge may be a rigid cartridge, which optionally may comprise a plurality of units.

The casing could have vertical access tubing inserted at one or more places to provide the means of supplying aeration, irrigation, and even heating systems to enhance root development and management. Leachate recovery/recycling systems for enhanced pollution control may also be an option in environmentally sensitive areas.

BRIEF DESCRIPTION OF THE DRAWINGS

FIG. 9 is a schematic representation of a cross-section of earth in which a hole has been augered in preparation for inserting of a rigid casing.

FIG. 10 is a schematic representation of a cross-section of the installation of a hard casing into the augered hole.

FIG. 11 is a schematic representation of a cross-section of the placement of a cartridge system into the hard casing, which has been inserted into the augered hole.

FIG. 12 is a schematic representation of the cross-section of the transplanting of a tree/soil cartridge, in which a tree has been planted.

FIG. 13 is a schematic representation of a cross-section of a planted small tree in the cartridge system.

FIG. 14 is a schematic representation of a cross-section of a planted large tree in the cartridge illustrating the downward growth of the root system within the cartridge.

DETAILED DESCRIPTION

The present invention concerns the planting, establishment and growing of commercially valuable plants using a root management system to develop a columnar-like rooting system which could ultimately lead to better managed plants and the harvesting of higher quality and/or quantity plants, crops or other plant derived products. When the term "tree" or "plant" is used, it should be understood by one of ordinary skill in the art to include, without limitation, any plant, plant species, tree, vegetation, cutting or the like, which may be suitable for use in connection with growing commercially valuable plants. The term "crop" as used herein shall refer to the product resulting from the growth of a plant and may include the plant itself, fruit harvested from the plant or any other commercially valuable component of or derived from the plant. The terms "soil" and "fill" as used herein shall refer to any soil medium, including medium made up of gravel, sand and/or soil and other soil-like material, whether natural or otherwise.

Figure 3:
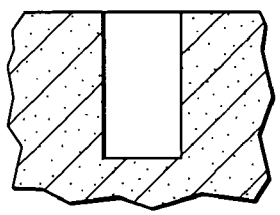
FIG. 3 is a schematic representation of a cross-section of earth in which a hole has been augered in preparation for insertion of a flexible casing.

FIGS. 3-8 depict a preferred aspect of the present invention. As shown in FIG. 3, a hole or opening in the earth must be created. This may be accomplished in any suitable manner, but it is preferably accomplished by augering (i.e., drilling) a cylindrical hole that is vertical or substantially vertical, though it can be at any angle. Alternatively, the hole may be any shape (e.g., a vertical borehole, conical (FIG. 15), step-like (FIGS. 16 and 17) or trench-like (FIG. 17). The hole may be about 5 to about 20 or more feet deep. Preferably, the depth is in the range of about 8 to 10 feet, though for certain circumstances, the depth may be at least about 10 feet. The diameter of the hole may be any length preferred by the grower. Preferably, the hole is about 6 inches to about 6 feet in diameter. In a more preferred aspect of the invention, the hole is about 1 foot to about 6 feet in diameter. More preferable is a diameter of about 1 to 4 feet, though larger diameters are contemplated for larger landscape trees.

Figure 4:
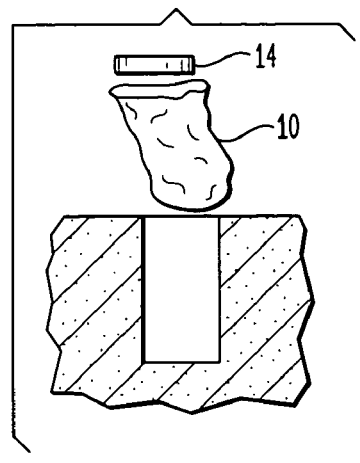
FIG. 4 is a schematic representation of a cross-section of the installation of a flexible casing and berm-like structure into the augered hole.
Figure 5:
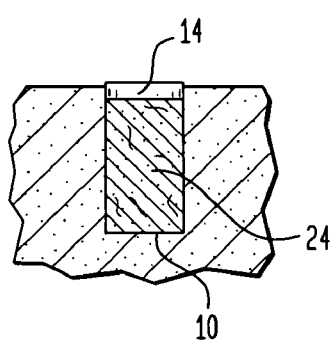
FIG. 5 is a schematic representation of a cross-section of the installed flexible casing and berm-like structure.

Referring to FIGS. 4 and 5, the prepared hole may be lined with a disposable or permanent liner. This liner may be a flexible casing 10. The flexible casing 10 may be made of any suitable material that is flexible and substantially impervious to water and nutrients. A preferred self-sealing, flexible casing is a medium to heavy gauge flexible plastic tubing, which is of a diameter that matches or exceeds the diameter of the hole and, if used, a rigid casing 12 that may be inserted into the hole. The plastic tubing may be 3 to 10 mils in thickness or any other suitable thickness given the circumstances. Alternatively, the walls of the hole may be sprayed with a material to provide a flexible casing 10. The flexible casing 10 may or may not be made of a biodegradable material, as is well known by those of ordinary skill in the art.

While the flexible casing 10 can be put in place together with a rigid casing 12 or after the rigid casing 12 is in place, with the rigid casing 12 later being removed, other techniques can also be used to place the flexible casing 10 in the hole. One such technique is to use a hollow stem auger with a mud rotary drilling method, which serves to keep the sides of the hole open when the auger is removed. To reach the desired depth, the flexible casing 10 is placed inside the hollow stem and the auger is pulled out, leaving the flexible casing 10 in place within the hole. As shown in FIG. 5, the flexible casing 10 may contain a berm-like structure 14 or any other suitable structure to maintain a berm around the planted tree to prevent water from entering the system. Alternatively, a mound of soil or other structure can be situated to prevent water and other run-off from entering the system where this is important through root zone management. In dry areas, a depression might also be developed to create a catchment to enhance water run-on and supply to the root zone of the plant.

The flexibility of the material used for the flexible casing 10 facilitates the self-sealing aspect of the tree harvested and used for transplantation in accordance with the present invention. The self-sealing quality of the flexible casing 10 inhibits the migration of water in the upper levels or surface of the ground to lower levels of soil. A pliable plastic material as discussed above seals tightly to the outside soil as the lined hole is filled with soil, gravel or other fill material. Also, it will be extremely difficult for roots to grow through. An additive may be added to at least portions of the alls of the hole to facilitate creation of a seal between the flexible casing and soil outside of the hole.

More specifically, when a hole is dug and backfilled against a hard casing 12, a natural loosened vertical pathway of outer soil lies against the hard casing 12. Instead of near-surface and surface water being absorbed and percolated through the outer soil, it is likely to find the vertical pathway at the junction of the hard casing 12 and outer soil, and migrate downward.

The flexible casing 10 may be forced against the irregular surface of the hole and fill any gaps so that it is tight against the outside soil. The sealing effect as created in the lined hole is back-filled such that the fill forces the flexible casing 10 against the walls of the hole. The tight seal between the outside soil, the flexible casing 10 and the soil inside the hole inhibits, and in some cases prohibits, the migration of surface water or water in the upper levels of earth from migrating to lower levels of earth. Any such water would thus be unavailable to the roots, such that the roots feed primarily on the water in the lower levels of the casing.

The flexible casing 10 may include a berm-like structure 14 that may be attached to or repositioned on, in or around flexible casing 10. In addition, the berm-like structure 14 may be inserted such that at least a portion is positioned above ground level to prevent water and other run off from entering the root management system.

A tree-root system cartridge 16 having the same configuration of the hole may be placed inside the casing/hole frame 18, as shown in FIG. 13. The structure of cartridge 16 may influence the downward growth of the root system of a tree grown therein.

As shown in FIG. 5, fill 24 is added to the prepared hole. Fill 24 for the lined hole preferably includes a good rooting medium. Any suitable rooting medium may be selected. Examples of such media are described in U.S. Pat. Nos. 5,829,191; 5,829,192; and 6,189,262; the contents of which are incorporated herein in the entireties. It may be desirable to put stones or pebbles at the bottom and/or at the top of the lined hole. Stones and/or pebbles may be used at both the top and bottom of the hole lined with a hard casing 12. At the top, the stones and/or pebbles will help insulate and limit high soil temperatures at the immediate soil surface during periods of intense sunlight. The stones and/or pebbles will also limit the sealing of the surface soil material to oxygen exchange by limiting rainwater compaction and/or the severe drying associated with the high soil temperatures, thereby keeping soil pores open for gas exchange. At the bottom, the stones and/or pebbles create a separation between the soil and the tube cartridge from that at the bottom of the cartridge, which will facilitate harvesting by reducing the adhesion to the bottom of the cartridge of the soil matrix, and will further act to limit root development to the bottom of the cartridge.

Figure 6:
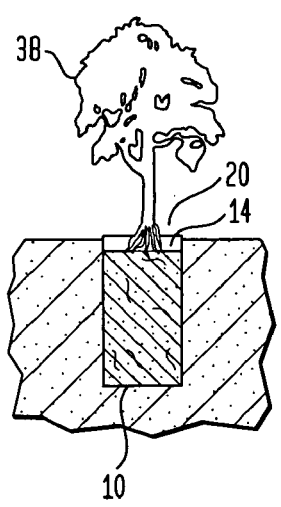
FIG. 6 is a schematic representation of the cross-section of the planting of a tree into the flexible casing.
Figure 7:
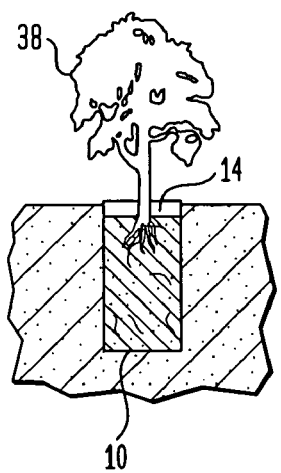
FIG. 7 is a schematic representation of a cross-section of a small tree planted in the flexible casing.
Figure 8:
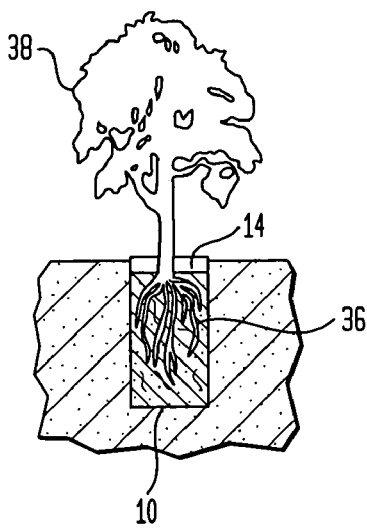
FIG. 8 is a schematic representation of a cross-section of a large tree planted in the flexible casing, illustrating the root system's growth downward within the flexible casing.

In FIGS. 6-8, a tree 38 has been planted and has developed an elongate root system 36 within the lined and filled hole. The flexible casing facilitates the directed downward growth of the root system 36. The flexible casing 10 around the columnar root system 36 will also facilitate the continued growth of the columnar root system 36 since the flexible casing 10 will substantially prevent lateral growth and will create a seal to prevent migration of surface water along the casing.

One of the advantages of growing trees as set forth above is that the hole prepared for growing the tree can be made to substantially match the size and shape of the hole which would be prepared at a transplantation site. Thus, upon harvesting, the trees grown by this method can readily fit into the holes at the transplantation site. The above method thus allows for ease of planting at a remote site. This advantage, taken with the ready rooting activity provided by the elongate root structure, is valuable in transplanting and continuing the growth of the tree.

FIGS. 9-14 illustrate another aspect of the invention, wherein the hole may be lined with a rigid casing 12, which preferably possesses a degree of rigidity or hardness by which it has some stiffness independently of any other structures. It may be of any suitable or desirable shape or size (see, e.g. FIGS. 15-17), although a cylindrical shape, as shown in FIG. 10, is preferred. In constructing and lining the hole, a conventional drilling technique or any other suitable technique for creating a hole can be used. Such a technique might include alternately augering the earth and pounding (or otherwise placing) the rigid casing 12 into the augered hole.

As shown in FIG. 10, rigid casing 12 typically will be cylindrical in shape and will be approximately in the range of about 6 inches to about 6 feet in diameter. Preferably, the diameter is about 1 to 6 feet, and more preferably about 1 to 4 feet, though circumstances may require smaller or larger diameters. The rigid casing 12 may be selected from PVC, ABS piping, any other suitable commercially available piping or any other suitable material. The rigid casing 12 maintains the structure of the augered hole during the planting process and may facilitate the downward growth of the root system of a tree planted in the prepared hole. The lined hole can be as deep as about 5 feet to about 20 or more feet.

Figure 20:
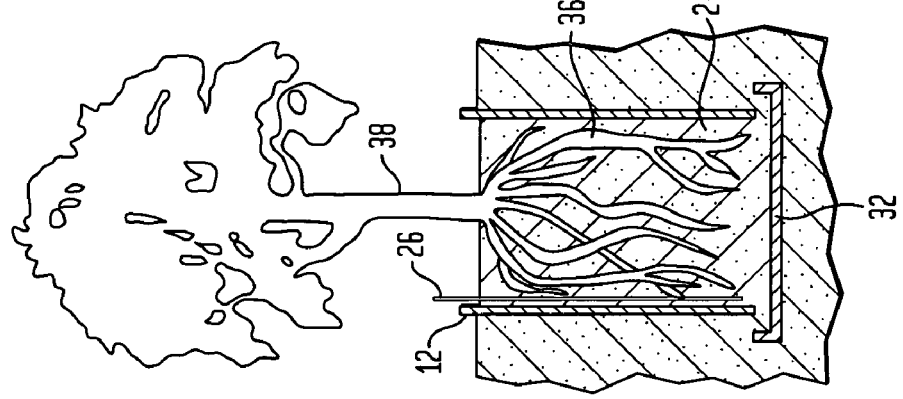
FIG. 20 is a schematic representation of another embodiment of a tree planted and grown for harvesting, illustrating in particular the use of the flexible casing to form a "bag" in connection with the structure for facilitating elongated growth of the root system.

It is recognized that the rigid casing 12, while preferred, is optional, since it is not required at all where the soil in which the hole is drilled is a tight soil such that the integrity of the hole may be maintained even without hard casing 12. As discussed above, the hole lined with the hard casing 12 may be also lined with a flexible casing 10, and the lined hole is backfilled with the fill, as shown in FIG. 20. It is noted that the rigid casing 12 is not required to facilitate the directed growth downward of the root system, as the flexible casing 10 will also facilitate such directed growth. Indeed, because of the self-sealing quality of the flexible casing 10, the roots of the tree may grow downward more aggressively. However, when the tree is ready for harvesting (for transplantation or further processing), the use of a hard casing 12 better facilitates such harvesting.

As shown in FIG. 11, one or more permanent or removable cartridges 16a or 16b may be provided at least partially in the prepared hole. The structure of the cartridge may influence the root system of a tree planted therein to grow downward within the cartridge. In FIG. 11, cartridges 16b and 16a, which may be substantially similar in shape and size, are inserted into hole-frame 18 to form a rigid casing system 22. Cartridge 16 may be selected from PVC, ABS piping, any other suitable commercially available piping or any other suitable material. Cartridge 16 is designed to be substantially similar in shape in relation to the hole-frame 18. Preferably, cartridge 16 is cylindrical, as shown in FIG. 11. Cartridge 16 may be segmented into a plurality of units, which may be interlocking units, to permit more manageable handling of the structure, for example, when transplanting a tree and soil contained in cartridge 16. The diameter of cartridge 16 will be approximately in the range of about 6 inches to 6 feet. Preferably, the diameter is about 1 to 6 feet, and more preferably about 1 to 4 feet, though circumstances may require smaller or larger diameters as may be determined or required by the grower. Cartridge 16 may also be about 5 feet to 20 or more feet in depth. Preferably, the cartridge will be a total of about 8 to 10 feet deep, though cartridges of at least about 10 feet in depth are contemplated. As noted above, cartridge 16 may be segmented to permit more easy handling and transporting. Although any size segment is contemplated, each segment may be about 1 to 5 feet deep.

As also shown in FIG. 11, hole-frame 18 may include a rigid casing 12; however, use of a flexible casing 10 is also contemplated.

In FIG. 12, fill 24 is added to cartridges 16a and 16b, and a tree 38 is planted in cartridge 16a. The tree/soil column 20 is then inserted into the hole-frame 18. Alternatively, tree 38 may be planted at least partially in the cartridge after the cartridge is provided in the prepared hole. As shown in FIG. 12, a casing system 22 is preferred that uses a non-flexible hole-frame 18 and a rigid cartridge 16 that is installed inside hole-frame 18. This allows the plant/soil column 20 to be replaced by lifting out the old cartridge 16a and installing a new cartridge 16a, which would eliminate the need for additional augering. If not required, the remaining cartridge segments (e.g., cartridge 16b as shown) may remain in the hole-frame 18. The rigid casing system 22 has the advantage of leaving in place connections and tubing 26 that could be used for irrigation, fertilization, leachate extraction or other processes known to one of ordinary skill in the art.

If flexible casing 10 is utilized in casing system 22, it may be replaced each time a plant/soil column 20 needs replacing (although the plant alone could be replaced without removing flexible casing 10 if caution were used). In the case of the use of a flexible casing 10, a plant/soil column 20 replacement would typically require augering a new hole whereby the old flexible casing 10 and plant/soil column 20 would be extracted.

In FIGS. 13 and 14, a tree 38 has been planted and has developed an elongate root system 36 within the cartridge system 22. The cartridge system 22 facilitates the directed downward growth of root system 36. One of the advantages of utilizing cartridge system 22 is that only portions of the cartridge may need replacement when harvesting or removing a tree for transplantation or further processing. The remaining cartridges 16b and fill 24 can be reused when a new tree/soil column 20 is provided. In addition, should a particular cartridge system 22 become contaminated either with contaminates or pathogens, the cartridge system 22 may be replaced while not contaminating other cartridge systems that may be in the vicinity of the effected tree and cartridge system. This may provide obvious economic benefits to a grower.

While most casings and cartridges for each of the above aspects of the invention discussed above may be substantially impermeable to root penetration and water movement, it is conceivable that there would be conditions where permeable casings would also be considered, especially casings that might be permeable in one direction. In addition, it is contemplated that biodegradable casings may be also be utilized, especially in settings where plant establishment and an environmentally "clean" area are among the goals of the grower.

As noted above, the tree 38 with its resulting long and narrow root system 36 may be harvested by any known method. Preferably, the tree/soil column 20 is removed to permit disposing of the tree or transporting the tree with substantially all of its long and narrow root system to a site for replanting the tree, to permit establishment and growth of the tree at the new site. In one aspect of the invention, a new tree 38 may be planted in the hole left by the harvested tree, for further growth and harvesting of the new tree and/or its crops.

In another aspect of the invention, the root management system includes a "closed-base" or "open-base" system. A closed-base system is closed at the bottom of the casing to prevent water, roots, leachate or pollutants from escaping the system. With the open-base system, the bottom of the system is open to allow subsurface irrigation by shallow groundwater. In the open-base system, roots are allowed to develop outside of the casing at the bottom of the column and intercept groundwater or deeply applied irrigation water. Leaching of fertilizers and other agricultural chemicals that might be applied to the soil column should not be a concern in the open-base system provided only subsurface irrigation is practiced. If surface irrigation supplements the subsurface irrigation then there is a modest risk for leaching to occur.

Figure 1:
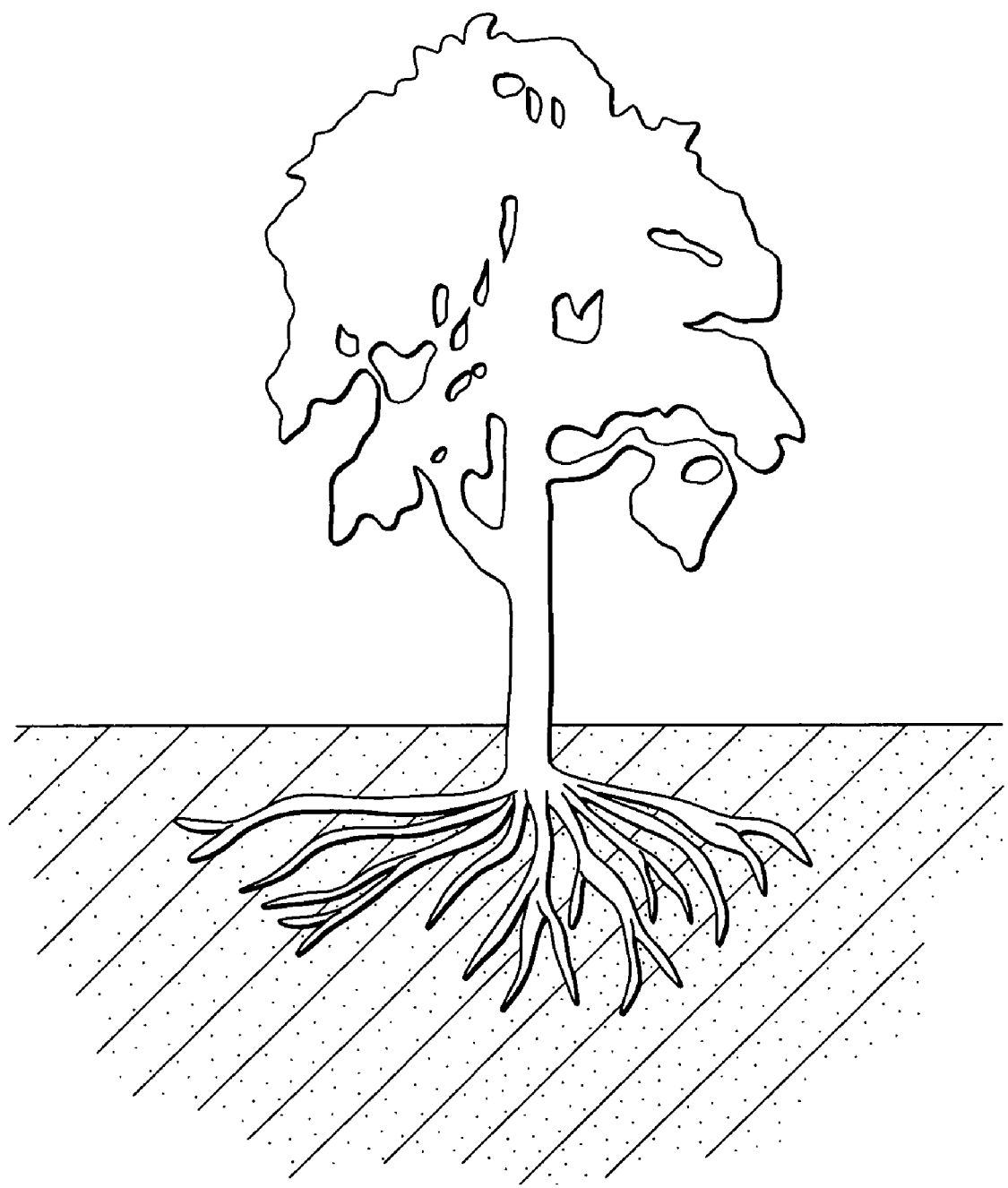
FIG. 1 is a side elevational view of a tree illustrating its natural shallow root system.
Figure 2:
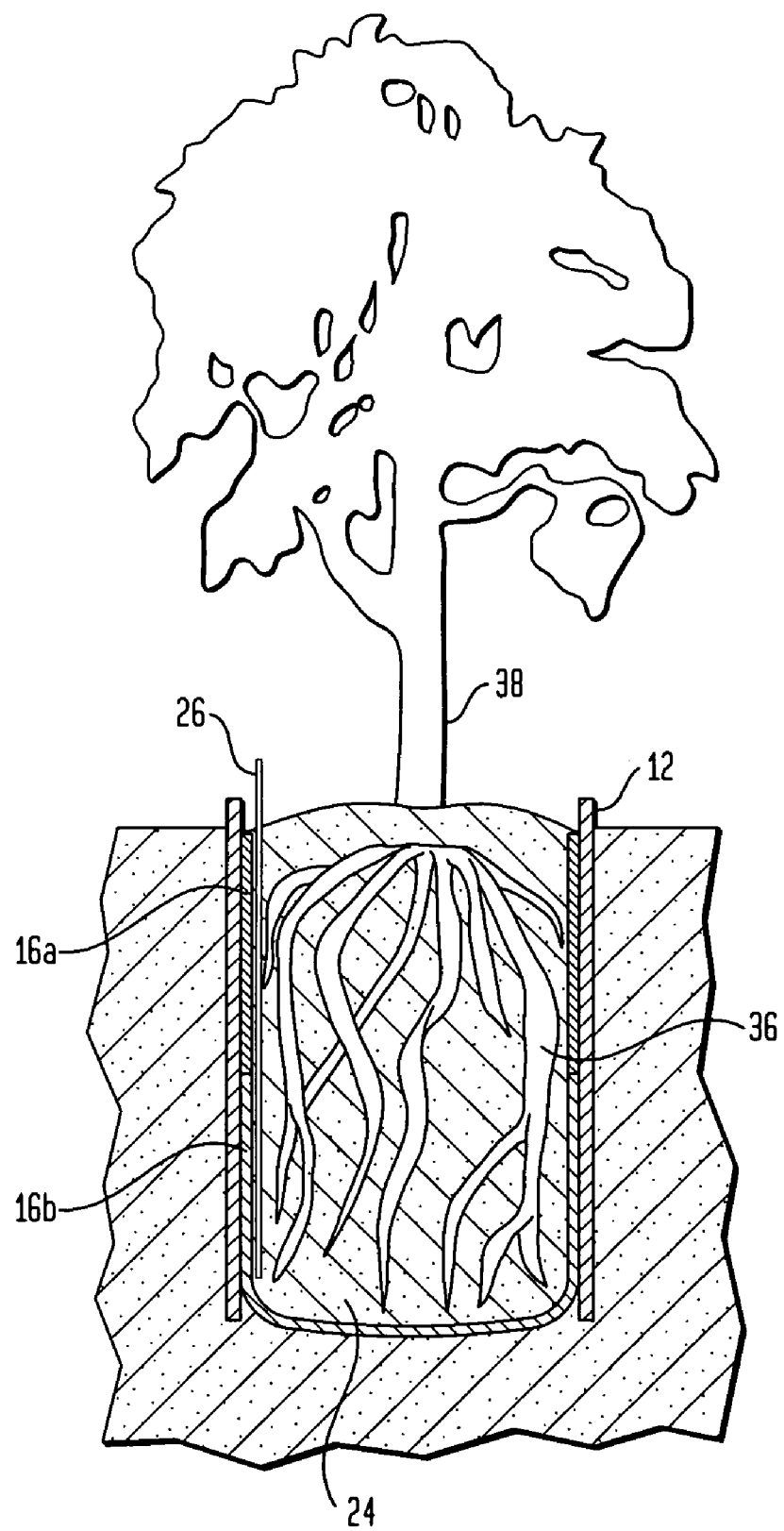
FIG. 2 is a schematic representation of a cross-section of a tree planted in the deep rooting system.

As shown in FIG. 2, a myriad of other alternatives for the root management system includes providing tubing 26 at least partially in the prepared hole so that a grower may more readily control the root management systems of the present invention. Such options include, but are not limited to: aeration tubing to allow air exchange between the surface and the bottom of the soil column; aeration tubing to allow venturi-effect air flow and exchange from one surface opening, through the soil column, and out the second surface opening, which would also, in certain environmental circumstances, precipitate water vapor in the tube, thus creating a passive irrigation system; fertilization tubing to allow fertilizers to be administered throughout the root zone; irrigation tubing to allow water to be administered throughout the root zone; pesticide tubing to allow pesticides to be administered throughout the root zone; and tubing to allow yet-to-be-determined amendments to be administered throughout the root zone. Such techniques and processes are well known to those of ordinary skill in the art.

In another aspect of the invention, the system and method may include covering the surface of the earth at the top of the prepared hole in order to further control access of water and nutrients to the tree and root system, for example, to prevent "service water" and other matter from entering the hole.

In another affect of the invention, an additive may be placed around the perimeter of the hole to facilitate the sealing of the rigid casing to the outside soil. When soil is somewhat coarser than a clay composition such an additive might me a clay material or similar composition such as bentonite, concrete mix or any other suitable material. The use of such an additive will depend on the plasticity of the soil. The less the plasticity of the outer soil, the more an additive will be helpful.

Figure 15:
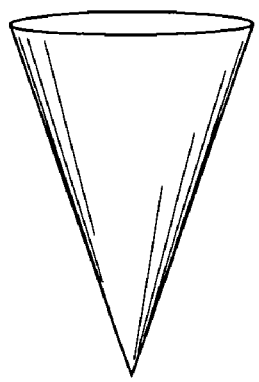
FIG. 15 is a schematic representation of a cross-section of an alternate, cone-shaped cartridge/casing configuration.
Figure 16:
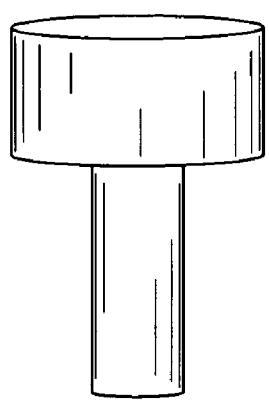
FIG. 16 is a schematic representation of a cross-section of an alternate, step-shaped cartridge/casing configuration.
Figure 17:
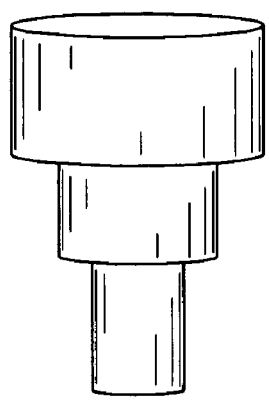
FIG. 17 is a schematic representation of a cross-section of an alternative, step-shaped cartridge/casing configuration.

In another aspect of the invention, a substantially truncated cone or step shaped cartridge as depicted in FIGS. 15-17 is used to facilitate the harvesting of trees grown to establish the long and narrow root system. A root system in such a shape will be easier to move upward upon harvest. The same is obviously true of the casing, hard or flexible, as removed with the root system and soil.

Figure 18:
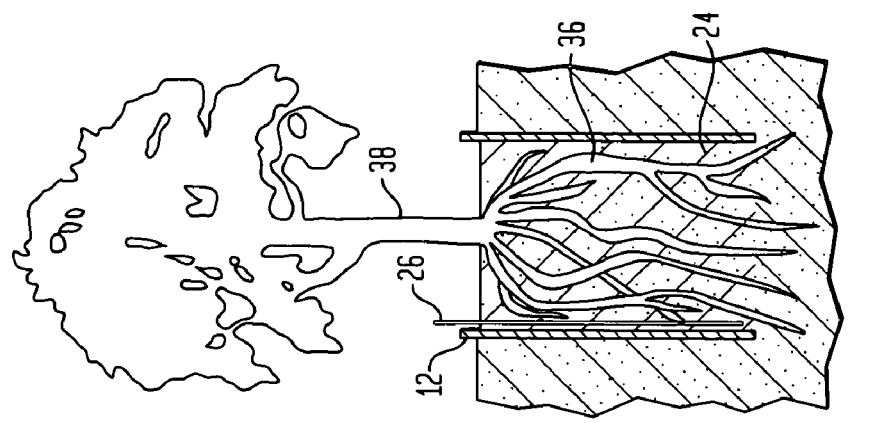
FIG. 18 is a schematic representation of another embodiment of a tree planted and grown for harvesting, illustrating in particular a cap at the bottom of the structure for facilitation of elongate growth of the root system.

FIG. 18 illustrates another aspect of the present invention by which a structure is provided at the bottom of the casing or cartridge of the invention to limit or prevent root growth beyond the structure. Cap 30 is provided at the bottom of the rigid casing 12. The cap 30 is a separate piece that connects to the rigid casing 12. Cap 30 may be joined at its ends to the ends of rigid casing 12. For instance, rigid casing 12 and cap 30 could be integrally formed. Alternatively, cap 30 may extend over the ends of rigid casing 12 to form a lip, as shown in FIG. 18. The purpose of the cap 30 is to control the growth of the root system, as well as to facilitate the harvesting of the tree, or more accurately the root system 36, from the prepared hole. When the cap 30 is used, the root system 36 must be irrigated from the top of the hole or through the use of access tubing 26.

Figure 19:
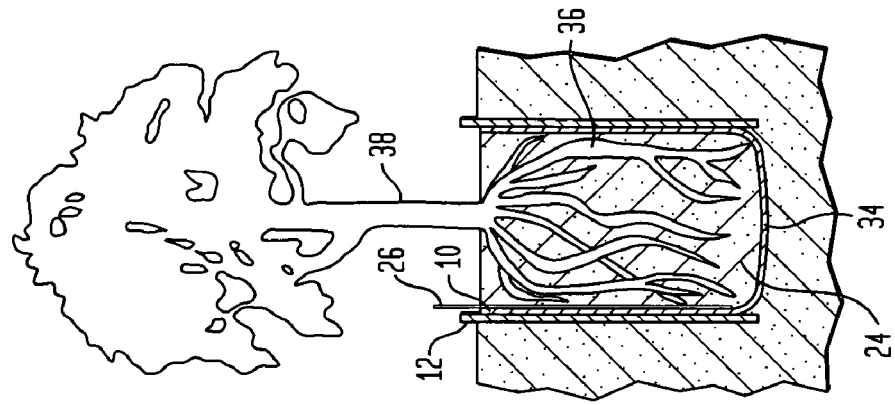
FIG. 19 is a schematic representation of another embodiment of a tree planted and grown for harvesting, illustrating in particular the use of a basin in connection with the structure for facilitating elongated growth of the root system.

FIG. 19 illustrates yet another aspect of the invention, by which a basin or reservoir 32 is provided below the hard casing 12, and may or may not be separated therefrom. The basin will hold water to a depth of a couple of inches, or if configured as a reservoir 32 could hold water to a depth of several feet. This will control the growth of the roots beyond the depth of the basin, and more importantly, outside of the prepared hole. The controlled growth of the root system 36 will facilitate harvesting of the same in a separated arrangement. This will also serve as a storage reservoir for water. In a separated system, excess water would overflow the basin or the reservoir and avoid the potential for flooding the entire root-column which could occur in a non-separated arrangement.

The cap 30 and basin/reservoir 32 can be made up of any suitable material that can hold water and/or prevent roots from growing beyond the same. For instance, PVC or ABS materials are suitable.

FIG. 20 reveals yet another embodiment by which the flexible casing 10 is provided not only on the walls of the prepared hole (against the rigid casing 12 in this embodiment), but also at the bottom of the prepared hole. The flexible casing 10 will thus serve a similar purpose to the cap 30 and basin 32. The structure of the flexible casing 10 at the bottom of the prepared hole can be completely sealed, but can be loosely tied so that the amount of water which is allowed to seep below it will be limited. Also, upon harvesting, the "bagged" structure of the root system 36 is advantageous for transportation and transplantation.

Each of the embodiments in FIGS. 18-20 provides situations in which water will pond near the bottom of the root system 36 to control the growth of the root system 36 or offer a water reservoir to the plant. The water which ponds in the cap 30, basin 32 or flexible casing 10 will prevent or limit water flow out of the prepared hole. Depending upon which of these systems is selected, irrigation may be necessary from the top, or it could be possible from the bottom or through access tubing 26 throughout the system, such as structures that extend to the bottom of the root system 36 to feed the root system 36.

Figure 21:
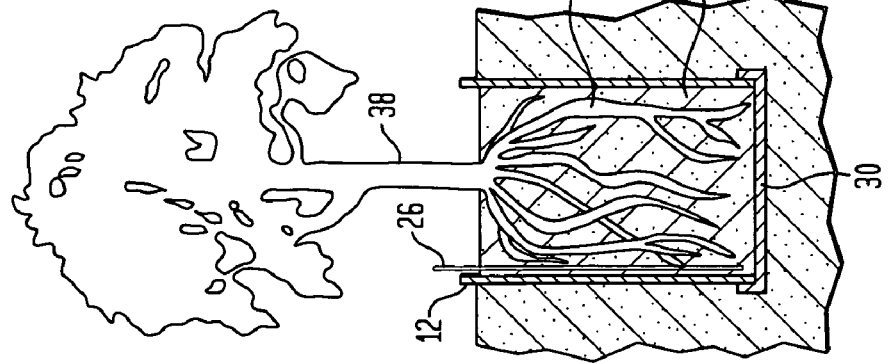
FIG. 21 is a schematic representation of a tree planted and grown for harvesting, illustrating the "open-based system" of root management.

FIG. 21 illustrates an "open base" system. In this aspect of the invention, the root management system may be designed to allow the roots to extract ground water from the base of the rooting column or to allow for irrigation. If irrigation is utilized, a leachate collection/recycling system could be added to the base of the cartridge to further enhance the pollution prevention aspect of the system. In addition, air, water, pesticides and nutrients could be injected throughout the entire root column via access tubing and comparable means to optimize the delivery of these inputs.

In addition, timing inputs such as irrigation and fertilization can be utilized to enhance crop quality and/or quantity. By limiting some nutrients and especially water during the flower development and embryonic fruit set, an increase in fruit quantity may result. Providing ample nutrients in irrigation during fruit development insures that the higher quantities of fruit develop to their full size and weight, thus increasing yield.

There are many ways to harvest the tree 38 with its narrow and deep root system, and any will suffice. However, one possible way to more quickly and efficiently harvest the tree 38 and its elongate root system 36 is to inject water at high pressure at the bottom of the hole. This can be accomplished using a structure built into either the hard casing 12, the cap 30 and/or the basin 32, or in any other manner. For instance, a tube or tubes carrying water at high pressure can be inserted in an opening between the hard casing 12 and the basin 32. This can be done at the time of harvest or at the time of planting. Such tubes might be juxtaposed along the casing 12 outside of the lined hole, extend through an opening between the hard casing 12 and the basin 32 and perhaps have nozzles directed upward into the lined and filled hole. Alternatively, tubes for carrying high pressure water might already be buried under the basins of many tree holes, and might be structurally associated with the basin 32, via holes in the bottom thereof. Indeed, such tube structures may be one way in which to maintain water in the cap 30 and/or basin 32 during growth.

As discussed above, the cartridge 16 can also be harvested with the tree 38 and its root system 36 such that upon transplantation of the tree 38, long and narrow root development continues. Transportation and transplanting are also facilitated by harvesting the tree 38 with a cartridge 16. To facilitate harvesting, water can be carried at high pressure at, for instance, the bottom of the hole, whereby the root system will be loosened within the hole and removal of the substantially long and narrow root system 36 would be facilitated.

Figure 22:
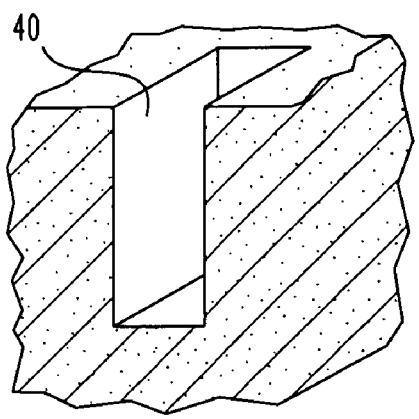
FIG. 22 is a schematic representation of a cross-section of an open trench that has been created in the earth.
Figure 23:
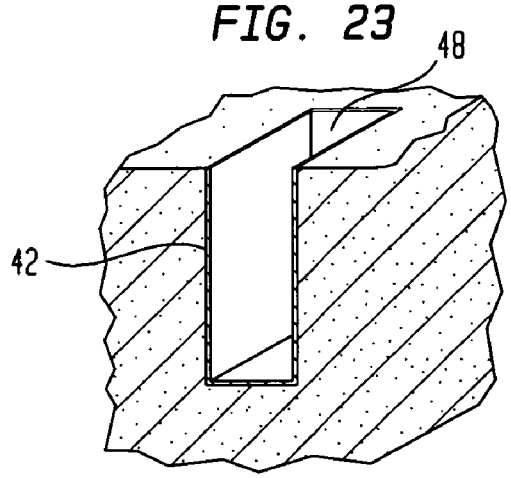
FIG. 23 is a schematic representation of a liner placed inside the trench. The liner can be opened or closed with the bottom and/or top.
Figure 24:
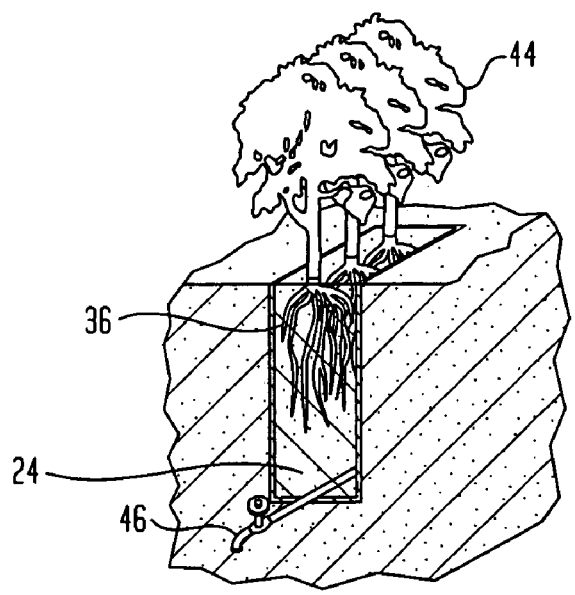
FIG. 24 is a schematic representation of a cross-section of trees planted inside the lined trench, illustrating the downward growth of the root system in the lined trench.

FIGS. 22-24 illustrate yet another aspect of the invention. In this embodiment, a trench 40 is created that would be lined to contain the root system 36. Trenching would be useful for smaller crops such as in vineyards and other specialty plants due to the higher plant populations per acre. Trenching may also be a useful tool in growing trees, if the cost of installation can be made to be more favorable than drilling. FIG. 22 illustrates an open trench 40 that is created. Any means to create the trench 40 is sufficient. The trench 40 may be of any dimension known to those of ordinary skill in the art. The preferred trench is about 5 to about 10 feet deep and about 1 to about 3 feet wide. As shown in FIG. 23, a liner 42 may be placed within the trench 40. The liner 42 can be a flexible or rigid casing. Moreover, the liner 42 can be open or closed at the bottom and/or top. FIG. 24 illustrates trees 44 that are grown inside the liner 42.

Using this embodiment, one may gain the potential for better managing roots in non-irrigated conditions where rainfall could be directed to the trench 40 and stored in the base of the trench 40. In non-irrigated conditions, the process of excavating the trench 40 would cause soil to be piled between the trenches. This pile could be conformed to create a slope towards the trench 40 thereby directing rainfall runoff into the trench 40. Drainage lines 46 with open/closed valves could be installed in the base of the lined trench 48 and used to drain off excess water to prevent water-logging conditions.

While the foregoing description of figures illustrates preferred embodiments of the various techniques in accordance with the present invention, it should be appreciated that the invention also covers various permutations of the foregoing described features, and that certain modifications may be made in the foregoing without departing from the spirit and scope of the present invention, which is defined by the claims set forth immediately hereafter.

The invention claimed is:

1. A method of growing commercially valuable trees to improve plant establishment, growth, and input management of water, nutrients and pesticides comprising the steps of:

creating a hole in the earth;

preparing the hole to influence the downward growth of the root system of a tree planted therein by lining the walls of the hole with a flexible casing which is substantially impervious to water and nutrients for root growth and is self-sealing such that the self-sealing casing will seal tightly to the walls of the hole to inhibit the migration of water from the surface or near the surface to deeper levels, which might otherwise occur at the portion between the walls of the hole and the flexible casing;

at least partially filling the hole with a rooting medium;

planting a tree in the at least partially filled hole;

providing a berm-like structure around the hole which is separate from the flexible casing and does not extend to the bottom of the flexible casing, wherein the berm-like structure is a ring; and establishing and growing the tree by controlling root development and access to water, nutrients, and pesticides so that the root system of such tree grows within the hole, and becomes long and narrow.

2. The method of claim 1, wherein the step of lining the walls of the hole with a flexible casing includes the step of providing a disposable or biodegradable flexible casing.

3. The method of claim 1, wherein the step of lining the walls of the hole with a flexible casing includes the step of providing a permanent flexible casing.

4. The method of claim 1, further including the step of providing an additive in at least a portion of the walls of the hole to facilitate the creation of a seal between the flexible casing and soil outside of the hole.

5. The method of claim 1, further including the step of providing a removable cartridge at least partially in the lined hole.

6. The method of claim 5, wherein the step of providing a removable cartridge includes the step of providing a rigid removable cartridge.

7. The method of claim 6, wherein the step of providing a rigid removable cartridge includes the step of providing a rigid removable cartridge comprising a plurality of units.

8. The method of claim 6, wherein the step of providing a rigid removable cartridge includes the step of providing a rigid removable cartridge comprising a plurality of interlocking units.

9. The method of claim 5, further including the step of at least partially filling the cartridge with a rooting medium.

10. The method of claim 1, wherein the step of planting a tree in the at least partially filled hole further includes the step of providing a removable cartridge of tree-root system and rooting medium at least partially in the lined hole, whereby the structure of the cartridge influences the root system of such tree to grow downward within the cartridge.

11. The method of claim 1, further including the step of covering the surface of the earth at the top of the hole in order to prevent service water from entering the hole.

12. The method of claim 1, further including the step of providing access tubing at least partially in the at least partially filled hole.

13. The method of claim 12, wherein the step of providing access tubing includes providing aeration tubing to allow air exchange between the surface and throughout the root zone of a tree planted therein.

14. The method of claim 12, wherein the step of providing the access tubing includes providing irrigation tubing to allow water to be administered throughout the root zone of a tree planted therein.

15. The method of claim 12, wherein the step of providing the access tubing includes providing fertilization tubing to allow fertilizer to be administered throughout the root zone of a tree planted therein.

16. The method of claim 12, wherein the step of providing the access tubing includes providing pesticide tubing to allow pesticides to be administered throughout the root zone of a tree planted therein.

17. The method of claim 1, wherein the berm-like structure is attached to the flexible casing.

18. The method of claim 1, wherein the berm-like structure is repositioned on, in, or around the flexible casing.

19. A method of growing commercially valuable trees to improve plant establishment, growth, and input management of water, nutrients and pesticides comprising the steps of:

creating a hole in the earth;

preparing the hole to influence the downward growth of the root system of a tree planted therein by lining the walls of the hole with a flexible casing which is substantially impervious to water and nutrients for root growth and is self-sealing such that the self-sealing casing will seal tightly to the walls of the hole to inhibit the migration of water from the surface or near the surface to deeper levels, which might otherwise occur at the portion between the walls of the hole and the flexible casing, wherein the step of lining the walls of the hole with a flexible casing includes the step of spraying a material on the walls of the hole to provide the flexible casing;

at least partially filling the hole with a rooting medium;

planting a tree in the at least partially filled hole; and establishing and growing the tree by controlling root development and access to water, nutrients, and pesticides so that the root system of such tree grows within the hole, and becomes long and narrow.

* * * * *

UNITED STATES PATENT AND TRADEMARK OFFICE
CERTIFICATE OF CORRECTION

PATENT NO. : 7,272,911 B2 Page 1 of 1
APPLICATION NO. : 10/797427
DATED : September 25, 2007
INVENTOR(S) : G. Gatliff It is certified that error appears in the above-identified patent and that said Letters Patent is hereby corrected as shown below:

Column 10, line 9, delete the word "alls" and insert the word --walls--.

Signed and Sealed this

Thirtieth Day of September, 2008

JON W. DUDAS
*Director of the United States Patent and Trademark Office*